Dec. 19, 1967   J. F. OYLER   3,358,981
SPILLAGE CHUTE FOR TRAVELING GRATE MACHINE
Filed Aug. 31, 1965   3 Sheets-Sheet 1

INVENTOR.
JOHN F. OYLER
BY
Christy, Parmelee & Strickland
ATTORNEY

Dec. 19, 1967 J. F. OYLER 3,358,981

SPILLAGE CHUTE FOR TRAVELING GRATE MACHINE

Filed Aug. 31, 1965 3 Sheets-Sheet 2

INVENTOR.
JOHN F. OYLER
BY
Christy, Pamelee & Strickland
ATTORNEY

Dec. 19, 1967     J. F. OYLER     3,358,981
SPILLAGE CHUTE FOR TRAVELING GRATE MACHINE
Filed Aug. 31, 1965     3 Sheets-Sheet 3

INVENTOR.
JOHN F. OYLER
BY
*Christy, Parmelee & Strickland*
ATTORNEY

United States Patent Office 3,358,981
Patented Dec. 19, 1967

3,358,981
SPILLAGE CHUTE FOR TRAVELING GRATE MACHINE
John F. Oyler, Mount Lebanon Township, Allegheny County, Pa., assignor to Dravo Corporation, Pittsburgh, Pa., a corporation of Pennsylvania
Filed Aug. 31, 1965, Ser. No. 484,035
3 Claims. (Cl. 266—21)

ABSTRACT OF THE DISCLOSURE

A traveling grate machine used for the heat-hardening or firing of ore pellets and similar bodies is disclosed. A chute assembly is provided in the discharge end of the machine movable with the sprocket wheels and shaft and arranged to receive spillage as the pallets of the machine start to move into the dumping position.

---

This invention relates to traveling grate machines and more especially to machines of this type used for the heat-hardening or firing of ore pellets and similar bodies.

Traveling grate machines of the type to which this invention relates comprise generally an upper trackway extending over a series of windboxes, along which a succession of pallets move in abutting relation continuously in one direction from a charging end to a discharging end, hoods being provided over all or part of this strand to cooperate with the windboxes in controlling the flow of gases through the pallets, the bottoms of the pallets, of course, being grates to support the charge while being pervious to the flow of air or gases therethrough. There is a return track under the upper track along which the pallets are returned in inverted position from the discharge end to the charging end. A pair of large power-driven sprocket wheels at the charging end elevate the pallets one at a time from the lower track to the upper one, and as each one is delivered to the upper track, it pushes the entire line of pallets on the upper trackway ahead. As each pallet reaches the discharge end it engages a pair of idler sprockets that carry it around guides to the lower track, and in doing so, invert it and spill its charge of pellets or similar bodies into a receiving chute.

The machine may be as much as two hundred feet or more in length and the pallets in their travel along the upper trackway become highly heated so that provision must be made for the thermal expansion of the long line of abutting pallets, which expansion is unequal to the expansion of the trackway and supporting frame of the machine. This is accomplished by supporting the idler sprockets at the discharge end of the machine in such manner that these sprockets and their shaft and shaft bearings may move lengthwise of the machine relative to the frame so as to always be in position to properly engage each pallet as it is pushed off the discharge end of the upper trackway.

While the pallets are in abutting relation as they move along the trackway, separation begins as each pallet in turn engages the idler sprocket, and as the pallets start moving a radius, the faces of the pallets which were parallel and abutting, diverge and open. This results in some of the pellets passing down between the now separating pallets, most often falling onto the inverted pallets on the lower track or out onto the shop floor. Attempts to provide a hopper or chute to collect pellets that fall through in this way have been unsuccessful because the translation or movement of the idler sprockets under thermal expansion of the strand of pallets carries the place at which the fall-through of the pellets occurs beyond the hopper or chute.

According to the present invention a receiving chute is mounted in the machine frame on rollers and so arranged that the traversing movement of the idler sprocket shaft transmits a corresponding movement to the spillage chute so that irrespective of any back and forth movement of the sprockets, the spillage chute is always in the same relative position under the places where spillage takes place.

A principal object of the invention therefore is to provide in a traveling grate machine a spillage chute arranged to move with the travel of the idler sprocket wheel shaft to maintain its relation to the periphery of the idler sprockets constant. Spillage occurs not only with pellets or similar bodies, but to a lesser extent with sinter, and while the invention is particularly applicable to machines for the firing of pellets of ore, it may be used on any traveling grate machine where spillage at the idler sprockets of the machine takes place.

The invention may be more fully understood by reference to the accompanying drawings, wherein.

Figure 1:
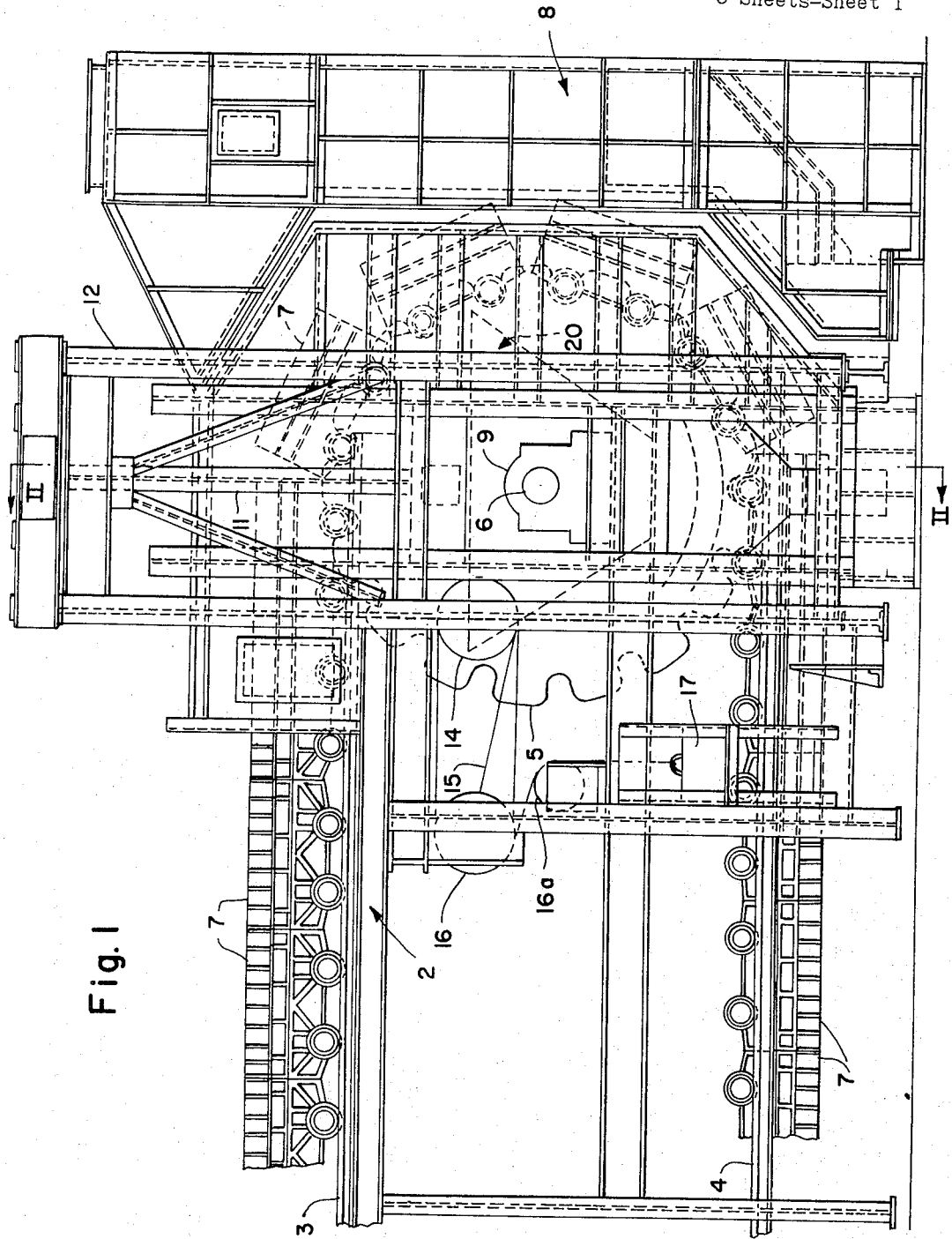
FIG. 1 is a side elevation of the discharge end of a traveling grate machine embodying my invention.
Figure 2:
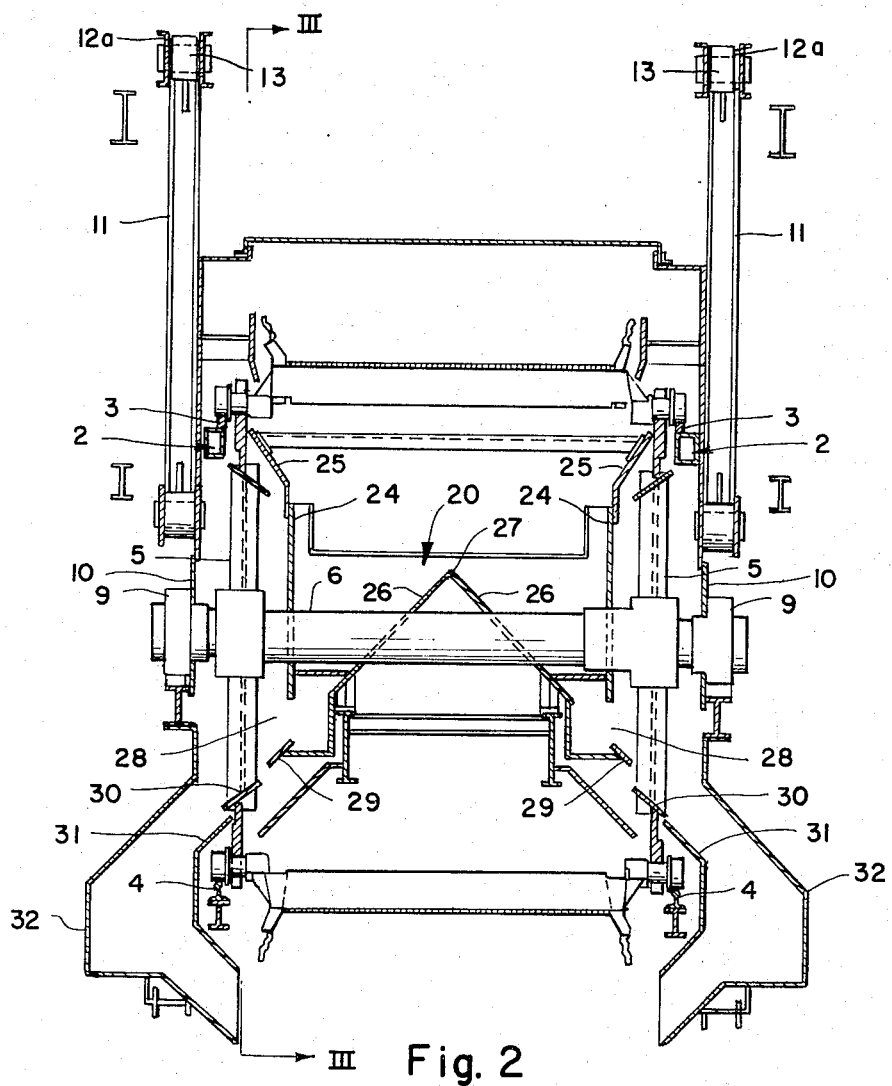
FIG. 2 is a transverse vertical section in the plane of line II—II of FIG. 1.
Figure 5:
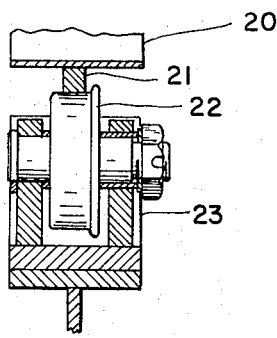
FIG. 5 is a fragmentary detail view showing partly in transverse section and partly in elevation one of the chute-supporting rollers.
Figure 4:
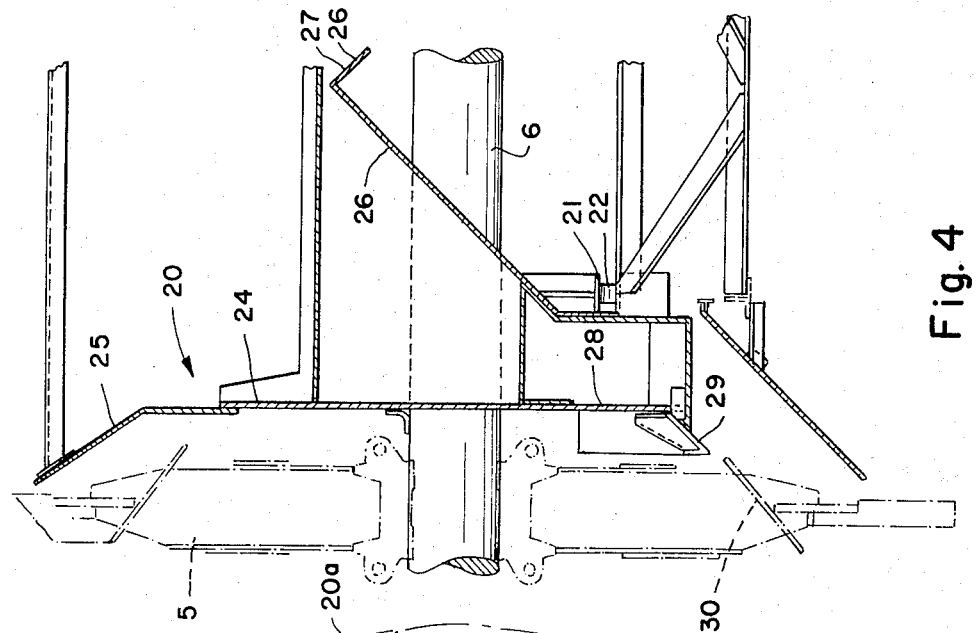
FIG. 4 is a fragmentary transverse section in the plane of line IV—IV of FIG. 3, parts of the structure being omitted for better illustration of this invention.
Figure 3:
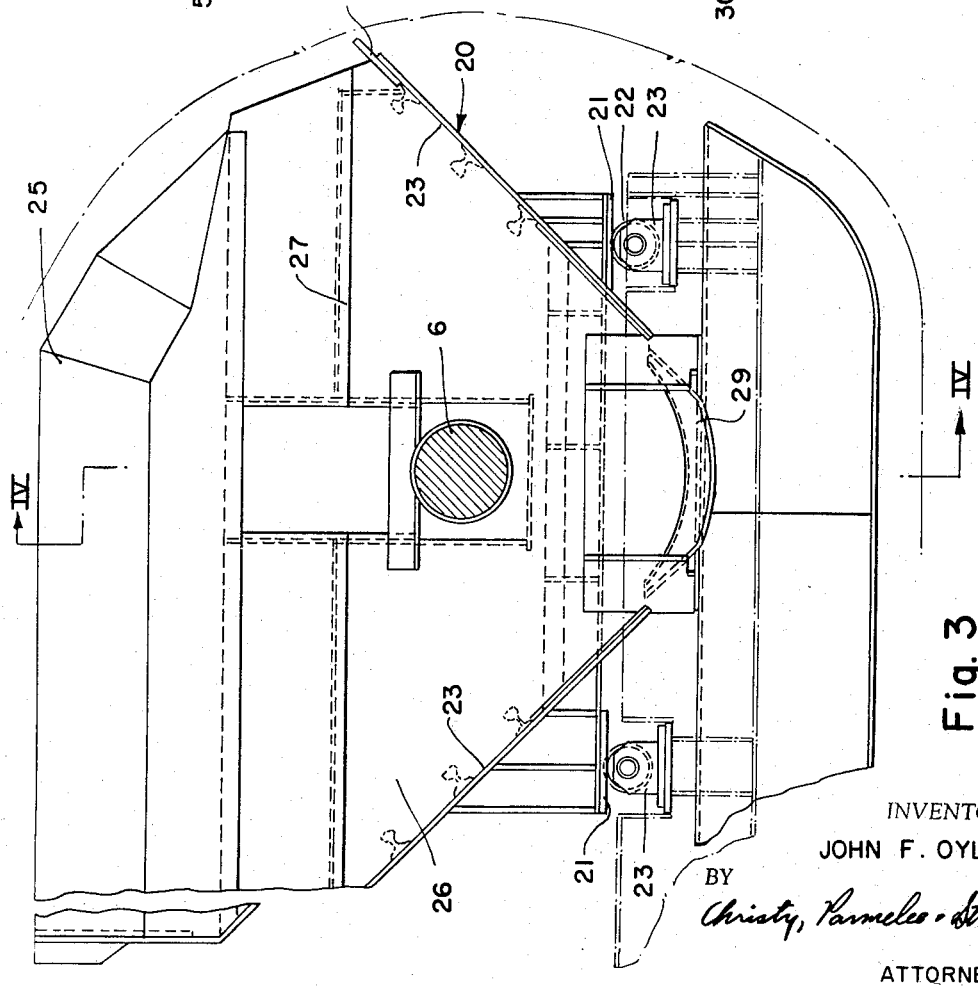
FIG. 3 is a vertical longitudinal section in the plane of line III—III of FIG. 2 but on a larger scale, and with the periphery of the sprocket wheel being shown only as a dot-and-dash circle.

In the drawings, 2 designates generally the main frame of a traveling grate machine adjacent the discharge end, and 3 designates the rails at the top along which the pallets travel toward the discharge end, while 4 designates the lower rails along which the pallets travel in inverted position to the charging end of the machine. The charging end and a drive therefor is the subject of a copending application of Stanley M. Coulter and Leonard J. Bachman, filed Aug. 16, 1965, and assigned to our common assignee, Ser. No. 479,769, now Patent No. 3,332,674.

At the discharge end there are two spaced sprocket wheels 5 mounted on a common shaft 6, these sprocket wheels being positioned to receive the successive pallets 7 as they are pushed off the rails 3 and carry them in conjunction with guide rails (not shown) around to the lower rails 4, dumping the charge in the pallets as they are so moved into a receiving structure 8. The sprockets 5 are rotated solely by the pallets as they are pushed from the charging end against the sprocket wheels, as is well understood in the art. The sprocket wheels 5 are sometimes referred to as the idler sprockets and the rails 3 are generally tangent to the circle described by their pitch diameter.

The shaft 6 for the idler sprockets is supported in bearings 9 in side frames 10 that are suspended by hangers 11 from a frame structure 12. The hangers 11 are carried by shoes 13 movable horizontally along rails 12a forming the upper part of the structure 12. With this arrangement the sprocket shaft and idler sprockets can move in the direction of the length of the machine independently of the frame 2.

This arrangement allows the sprocket wheels to adjust themselves to the expansion of the line of pallets, or so-called strand, on the upper track, which expansion is greater than or different from the expansion of the frame 2. To maintain the sprockets always in the right position, sheaves 14 are located on the side frames and cables 15, anchored at one end to the frame 2 pass around these sheaves and over sheaves 16 and 16a and they are attached to counterweight 17. This arrangement exerts a biasing force tending to yieldably resist travel of the sprockets to the right and urge them toward the left or charging end as viewed in FIG. 1. So much of the machine is known to the art.

It will be seen that if the pallets are loaded with round pellets of ore, many of these will roll off the edges of the pallets as the pallets separate in moving from the tangent upper rails around the sprockets, and this spillage falls between the pallets onto the inverted pallets on the return track or to the shop floor. The point at which spillage takes place moves with relation to the frame of the machine with the traverse of the sprockets. Attempts to catch the spillage in a hopper have not worked out because if the hopper is positioned to catch the pellets when the sprockets are at the outermost limit of their travel, it interferes with the retracting movement and projects into the curved path around which the pallets are traveling.

According to this invention, there is provided a hopper-like chute structure designated generally as 20 which has rails or runners 21 at four places, two at each side near the bottom of the hopper. These rails or runners rest on rollers 22 carried in brackets 23 on the frame of the machine. The sprocket wheel shaft 6 passes through this chute structure and has only a working clearance. Any travel of the shaft in one direction or the other imparts a corresponding travel to the hopper or chute, so that the chute maintains a constant fixed relation to the sprockets and the separations of the pallets where spillage occurs. The edge 20a of the hopper-like chute nearest the travel of the pallets around the sprocket wheels is constantly in the same relative position to said path of travel. With this arrangement, traveling grate type machines designated for use in making sinter, where the ore is caked on the pallets and fall-through is negligible, may be readily used for pellets.

In the drawings, the chute has fore-and-aft transverse walls 23 which converge downwardly. It has side walls 24 that flare outwardly at 25 at the top. It has oppositely-sloping intermediate plates 26 extending divergently downward from a central ridge 27 to deflect the pellets to one side or the other as they fall into the open top.

The pellets discharge through the side openings 28 onto a curved plate 29, passing through the sloped rim portion 30 of the sprocket wheels onto an elongated deflector plate 31 which forms a part of spillage receiving chute structure 32 externally fixed to the machine frame and with respect to which the structure 20 is movable. These external fixed spillage receiving chutes at each side of the machine direct the spillage into a receiver (not shown).

Most of the pellets, not spillage, are dumped as the pallets move down into a receiving structure 8, forming no part of the instant invention.

The idler sprocket shaft 6 passes through openings in the side walls 24 and the intermediate plates 26, the width of the openings in a horizontal direction being just enough larger than the diameter of the shaft to provide a free turning clearance, but close enough so that there is no appreciable relative horizontal movement between the shaft and the chute assembly 20. The guides for restraining the pallets as they are carried around by the sprockets and other parts of the equipment which are more or less conventional and which form no part of the present invention, have not been described.

The invention provides in a traveling grate machine, and particularly such a machine used for the firing of loose material such as pellets, a unique arrangement for taking care of spillage. While I have shown and described certain specific parts of the apparatus, it will be understood that this is by way of illustration, and that those skilled in the art may modify the structure in various ways to facilitate erection of the machine or the assembly of parts in the field, but wherein the elements of my invention as defined in the following claims are embodied.

I claim:

1. In a traveling grate machine having a frame supporting a generally horizontal upper track terminating at a discharge end and along which pallets progressively travel toward the discharge end, the machine having a pair of idler sprocket wheels carried on a common shaft at the discharge end for dumping the pallets and transferring them to a return track with means for supporting the idler sprocket wheels and shaft for movement lengthwise of the machine relative to the frame and upper track, the invention comprising:

a spillage chute assembly in the discharge end of the machine between the sprocket wheels arranged to receive spillage from the pallets as they start to move into the dumping position, said spillage chute being supported in the machine for movement with the sprocket wheels and shaft.

2. A traveling grate machine as defined in claim 1 wherein the spillage chute assembly comprises a hopper-like structure located under the discharge end of the upper track and extending under the place where the pallets separate in starting to discharge, said hopper-like structure having a pellet discharge outlet, means on the frame supporting said hopper-like structure for movement lengthwise of the machine with the sprocket wheels and shaft, and means for transmitting the endwise travel of the sprocket wheels to the hopper-like structure.

3. A traveling grate machine as defined in claim 1 wherein the spillage chute assembly comprises a hopper-like structure located under the discharge end of the upper track and extending under the place where the pallets separate in starting to discharge, said hopper-like structure having a pellet discharge outlet, means on the frame comprising rollers operatively interposed between the frame and hopper-like structure supporting said hopper-like structure for movement lengthwise of the machine with the sprocket wheels and shaft, and means for transmitting the endwise travel of the sprocket wheels to the hopper-like structure, said last-named means comprising elements of the hopper in encircling contact with the shaft through which travel of the shaft is transmitted to the hopper-like structure.

References Cited

UNITED STATES PATENTS

| | | | |
|---|---|---|---|
| 2,498,766 | 2/1950 | Pettigrew | 266—21 X |
| 2,652,242 | 9/1953 | Sapp | 266—21 |
| 2,987,307 | 6/1961 | Homan | 266—21 |
| 3,147,846 | 9/1964 | Huntoon | 198—69 X |
| 3,201,102 | 8/1965 | Stieler et al. | 266—21 |

J. SPENCER OVERHOLSER, *Primary Examiner.*

R. S. ANNEAR, *Assistant Examiner.*